Dec. 29, 1925.  
G. F. PORTEN  
1,567,543  
MACHINE OR APPARATUS FOR THE PRINTING OF PHOTOGRAPHIC FILMS  
Filed April 9, 1924  
4 Sheets-Sheet 1

Inventor.
George F. Porten
By
George A. Prevost
Atty

Dec. 29, 1925. 1,567,543
G. F. PORTEN
MACHINE OR APPARATUS FOR THE PRINTING OF PHOTOGRAPHIC FILMS
Filed April 9, 1924 4 Sheets-Sheet 2

Dec. 29, 1925.

G. F. PORTEN 1,567,543

MACHINE OR APPARATUS FOR THE PRINTING OF PHOTOGRAPHIC FILMS

Filed April 9, 1924     4 Sheets-Sheet 4

Inventor:
George F. Porten
By
George A. Prevost
Atty

Patented Dec. 29, 1925.

1,567,543

UNITED STATES PATENT OFFICE.

GEORGE FRITZ PORTEN, OF LONDON, ENGLAND, ASSIGNOR OF ONE-HALF TO RALPH DAVIS, OF LONDON, ENGLAND.

MACHINE OR APPARATUS FOR THE PRINTING OF PHOTOGRAPHIC FILMS.

Application filed April 9, 1924. Serial No. 705,348.

*To all whom it may concern:*

Be it known that I, GEORGE FRITZ PORTEN, a citizen of the German Republic, residing at Gloucester House, 19 Charing Cross Road, London, England, have invented a new and useful Machine or Apparatus for the Printing of Photographic Films, of which the following is a specification.

This invention relates to a machine or apparatus for printing photographic films, such as cinematographic films from a negative film.

The object of the invention is to provide a machine by means of which films of a relatively low degree of sensitiveness can be employed. Such films, as compared with the usual silver film, require an exposure of several seconds to an intense light instead of an exposure of a fraction of a second only, and this is rendered practically possible in the machine forming the subject of this invention.

According to the invention apparatus for printing photographic films is provided wherein one or more films arranged in contact with one or more master or negative films is or are intermittently moved the length of one picture in front of windows of dimensions to expose, say, three consecutive pictures and are held stationary for a suitable period to the action of light.

In a suitable arrangement for carrying out the invention, a number, say two, of sensitive films are independently carried on drums in light-tight casings whence they pass into a light-tight casing containing a series of intermittently operated feed rollers, preferably furnished with teeth which engage the usual holes along the edges of the films. Into this second casing and on to the feed rollers, there are also passed the master films from which the copies are to be made. Each master film then passes in contact with the sensitive film into an exposure chamber which is provided with windows wherein several consecutive pictures are exposed for the requisite time to light proceeding from any suitable source. Each pair of contacting films is fed by means of a device which is advantageously mounted in the exposure chamber and which devices have a common driving mechanism.

From the exposure chamber each set of two films is passed by an intermittently driven toothed roller to a drum in a light-tight casing each separated master film being received on an external drum or other storing device.

In practice, the windows of the exposure chamber are made independent from the other parts of the apparatus to enable them to be brought into correct register with the contacting films. The construction of the apparatus also permits of a stream or streams of air being directed against the master films for purposes of cooling.

To enable the invention to be fully understood I will describe it by reference to the accompanying drawing, in which:—

Figure 1:
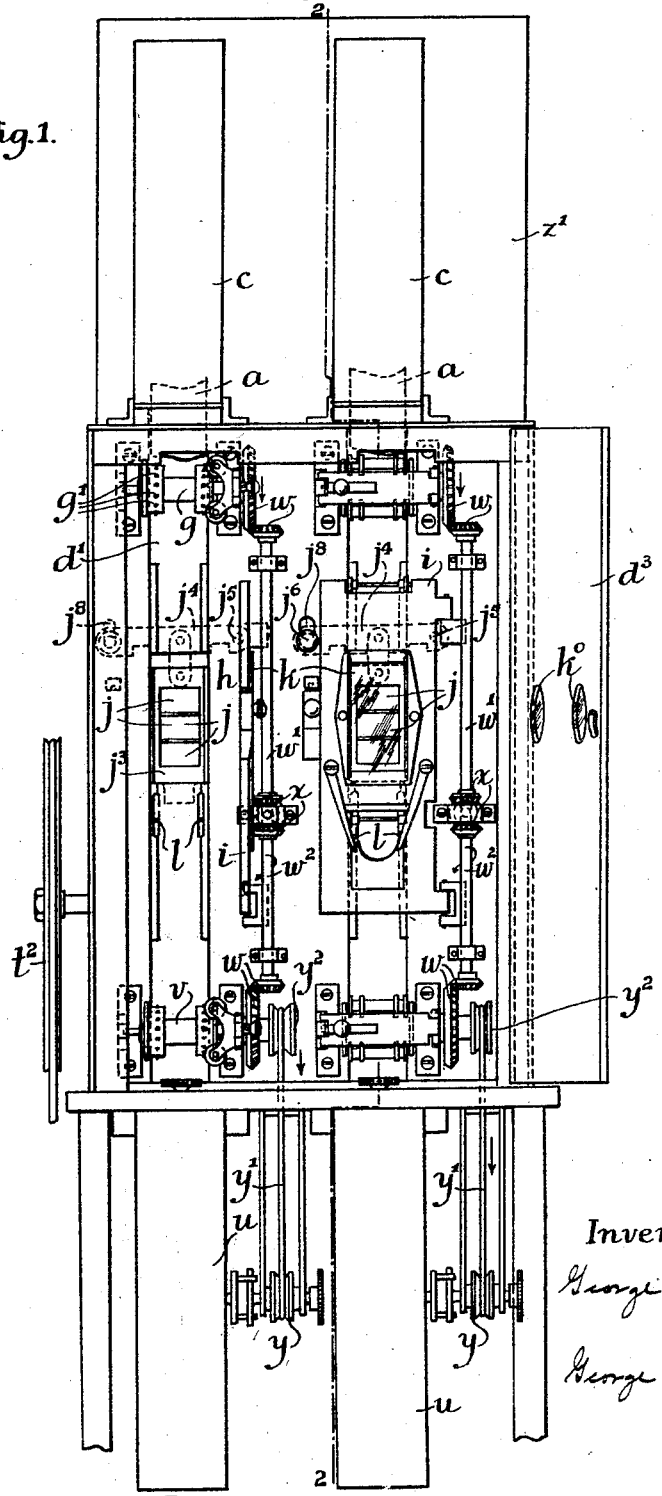
Figure 1 is an elevation of apparatus constructed in accordance with the invention for printing photographic films and showing the door of the body of the apparatus open to disclose the interior mechanism.
Figure 2:
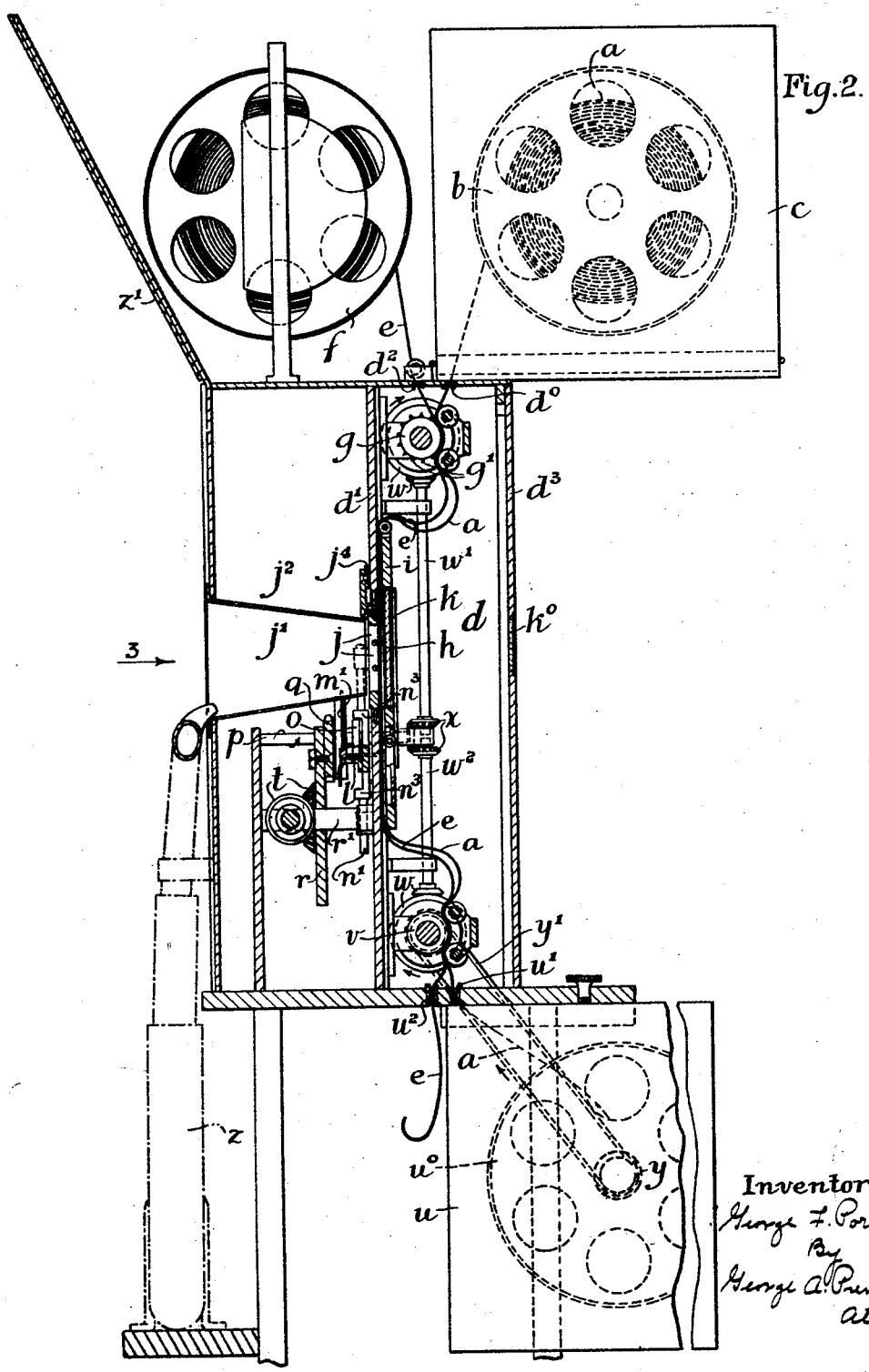
Figure 2 is a vertical section on the line 2—2, Figure 1.
Figure 3:
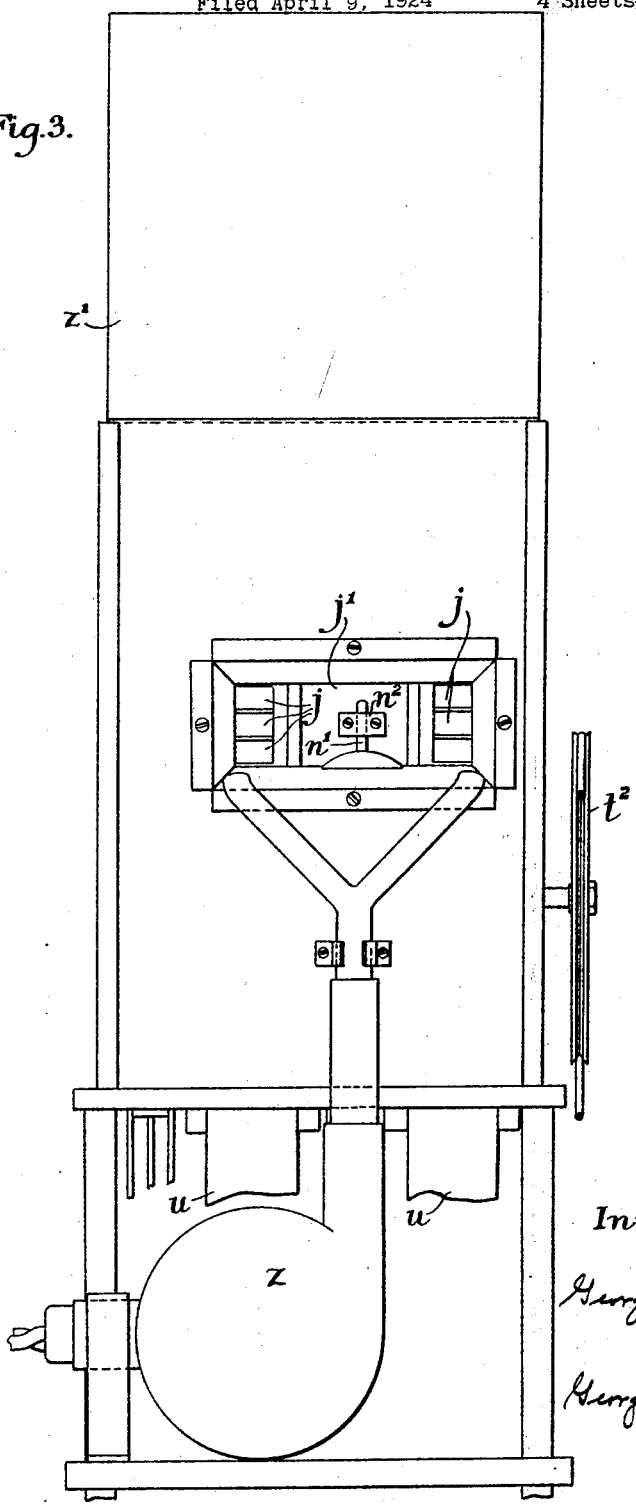
Figure 3 is an elevation of the apparatus looking on the direction of the arrow 3, Figure 2.
Figure 4:
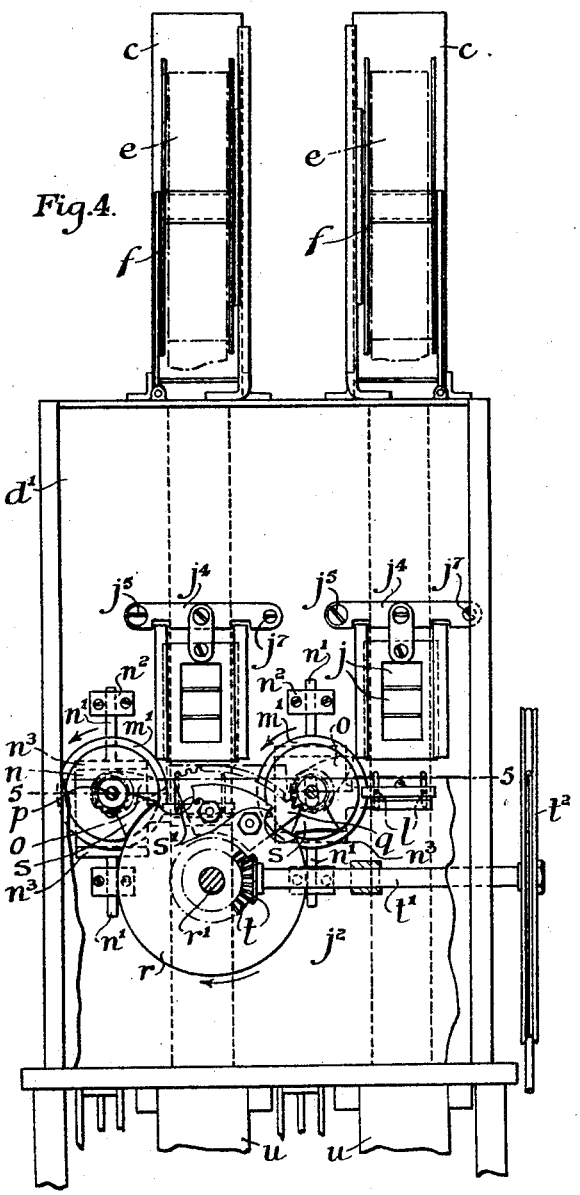
Figure 4 is a view similar to Figure 3, but with certain parts removed.
Figure 5:
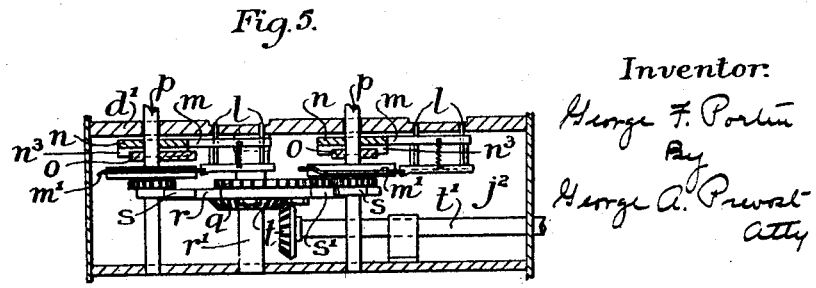
Figure 5 is a horizontal section on the line 5—5, Figure 4, showing a portion only of the apparatus in the plane of the section.

$a, a$ are the two sensitive films to be printed and which are independently carried on the drums $b, b$ in the light-tight casings $c, c$. $d$ is the light-tight casing into which the said films $a$ pass through light-tight slits $d^0$ from the drums $b$, into contact with the master or negative films $e, e$ carried by the drums $f, f$ outside the said casing $d$ and which pass into the casing $d$ through light-tight slits $d^2$, each pair of contacting films $a$ and $e$ passing into contact with the feed-roller $g$ provided with sprocket teeth $g^1$ to engage with the usual holes along the edges of the films so as to draw the latter from their respective drums $b$ and $f$, the roller $g$ being intermittently driven as hereinafter described. $h$ is the exposure chamber into which each pair of contact films passes, the said chambers being constituted by one of the walls $d^1$ of the casing $d$ and by doors or gates $i$ hinged to the said wall. $j, j$ are the window openings in the wall $d^1$ for the passage of the light for printing the two sensitive films $a$, a passage $j^1$ for the light extending through a compartment $j^2$ to the said window openings. Each of the window openings $j$ is shown of a length equal to that of three consecutive pictures on the films and each exposure movement of the latter corresponds to the length of one picture. The window openings $j$ are made in frames $j^3$ slidable in guides in the wall $d^1$ in the direction of the length of the contacting films so that they can be adjusted to register with the pictures on the said films. The adjustment is effected by levers $j^4$ fulcrumed to the wall $d^1$ at $j^5$ and operable by nuts $j^6$ screwing on to screws $j^7$ at the free ends of the levers, the said screws passing through slots $j^8$ in the wall $d^1$ against which the nuts bear to secure the levers after adjustment. $k$, $k$ are window openings in the doors or gates $i$ corresponding with the window openings $j$ and filled in with a transparent medium such as ruby glass for inspection purposes, another inspection window opening $k^0$, also filled in with a transparent medium, such as ruby glass, being provided in the door $d^3$ of the casing $d$ opposite each opening $k$.

Each pair of contacting films $a$ and $e$ is fed down through the exposure chamber by a pair of pins or teeth $l$, $l$ extending through the wall $d^1$ from the compartment $j^2$, the said pins being slidably mounted in guideholes in a horizontal arm $m$ so as to be engaged with a pair of the holes along the opposite edges of the films, the pins $l$ being then moved down to feed the films and withdrawn therefrom and raised to engage another pair of the said holes and so on. The engaging and disengaging movements of each pair of pins $l$ are effected by a rotating cam $m^1$, whilst the rising and falling movements of the said pins are effected by a frame $n$ carrying the arm $m$, the said frame having vertically arranged and aligned rod extensions $n^1$ mounted slidably in guides $n^2$, and horizontal ribs $n^3$ against which a rotating cam $o$ alternately strikes, the said cam $o$ and the cam $m$ being mounted on the common driving shaft $p$. The two shafts $p$ are rotated intermittently to move the two pairs of contacting films $a$ and $e$ by a toothed segment $q$ on a disc $r$ common to them both, the said disc holding the said shafts rigid in the interval between the rotations, by its periphery engaging the corresponding curved end of an arm $s$ on each of the said shafts, recesses $s^1$ being provided in the periphery of the disc $r$ to allow the passage of the said arms when the shafts are rotated. During the interval between the rotations of the shafts $p$ the printing of the sensitive films takes place. The disc $r$ is rotated on a shaft $r^1$ by means of bevel gearing $t$, a shaft $t^1$ and a pulley $t^2$ driven by a suitable motor, not shown, and the speed of which can be varied according to the exposure required for the sensitive films.

$u$ is the light-tight lower casing for the reception on drums $u^0$ therein of each sensitive film $a$ after exposure, and $v$, $v$ are the intermittently driven sprocket feed-rollers which are similar to the feed-rollers $g$, for feeding the said films $a$ through light-tight slits $u^1$ to the said casings $u$ and the master films $e$ through light-tight slits $u^2$ to the exterior of the apparatus. The feed-rollers $g$ and $v$ for each pair of contacting films are rotated by bevel gearing $w$ from shafts $w^1$, $w^2$, respectively, which shafts are driven by bevel-gearing $x$ from one of the shafts $p$, so that the intermittent rotary movements of the latter are imparted to the said rollers $g$ and $v$. The drums $u^0$ are also rotated to wind the films $a$ thereon, by means of pulleys $y$, elastic driving bands $y^1$ and pulleys $y^2$ on the shafts of the feed rollers $v$.

$z$ is a blower or fan operated electrically for directing streams of air on to the portion of the master films $e$ exposed through the window openings $j$ to maintain them cool when being subjected to the rays from a projection lamp such as an electric arc lamp. $z^1$ is a shield, preferably covered with asbestos, to protect the films $e$ against the heat of the projection lamp.

Although I have described the apparatus as designed for printing two sensitive films simultaneously, it is to be understood that it may be adapted for printing one only or more than two such films simultaneously.

Claims.

1. Apparatus of the kind hereinbefore referred to for printing photographic films, comprising a casing, a plurality of exposure windows in said casing, said windows being of a dimension equal to the length of a plurality of consecutive pictures, a common means for intermittently moving films, arranged in contact with master films, past each of said windows, each intermittent movement feeding the films the length of one picture, said means including a common shaft having a beveled gear thereon adapted to engage a beveled gear on a rotatable disc to actuate said disc, and means on said disc for intermittently rotating a plurality of shafts on each of which is mounted a cam for controlling the movement of said films past the windows.

2. In an apparatus of the kind hereinbefore referred to, for printing photographic films, including means for passing a master film in contact with a sensitive film past a window and exposing the same to a source of light for the requisite time, said means comprising an arm provided with guide holes, pins slidably mounted in said guide holes, a cam for engaging said pins with and disengaging them from the film, a frame carrying the said arm and slidable to and fro longitudinally of the film, a second cam effecting such to and fro movements, the two cams being mounted on a common shaft, a pinion on said shaft, a disc carried on another shaft and having a toothed segment to engage each pinion in turn, arms on each of the shafts carrying the pinions, designed to fit the periphery of the disc so that the said shafts are held rigid when not being rotated by the toothed segment, and recesses in the disc for the passage of the arms when the pinions are being rotated by the toothed segment.

GEORGE FRITZ PORTEN.